Feb. 8, 1927.  1,616,730
J. WOLFF
TALKING MACHINE
Filed May 5, 1920  2 Sheets-Sheet 1

Feb. 8, 1927.

J. WOLFF

TALKING MACHINE

Filed May 5, 1920

Inventor
Joseph Wolff
By his Attorney
Jacob Schechter

Patented Feb. 8, 1927.

1,616,730

UNITED STATES PATENT OFFICE.

JOSEPH WOLFF, OF BROOKLYN, NEW YORK, ASSIGNOR, BY MESNE ASSIGNMENTS, TO SONORA PHONOGRAPH COMPANY, INC., A CORPORATION OF NEW YORK.

TALKING MACHINE.

Application filed May 5, 1920. Serial No. 379,052.

My invention relates to talking machines and more particularly to such a type of machine as may be conveniently moved from place to place, and known commercially as the "portable" type.

The objects of the invention are to produce a portable talking machine which will be compact, in which a plurality of records may be protected and transported, in which the mechanism may be protected from injury during transportation, which will be neat and attractive in appearance, and which will provide means for retaining record discs in position secured from possible breakage while not in use.

With these and other objects in view to be more fully set forth hereinafter, the invention consists in the novel construction, combination of elements, and arrangement of parts which will be exemplified in the operation and construction hereinafter described in the specification and illustrated in the accompanying drawings, considered together or separately.

The inventive idea involved is capable of receiving a variety of mechanical expressions, one of which for the purpose of illustrating the invention is shown in the accompanying drawings.

The invention will be first described in connection with the accompanying drawings, illustrating one embodiment of the invention, wherein similar reference characters are used to designate corresponding parts throughout the several views, and then more specifically defined and indicated in the appended claim.

In the drawings,—

Figure 1:
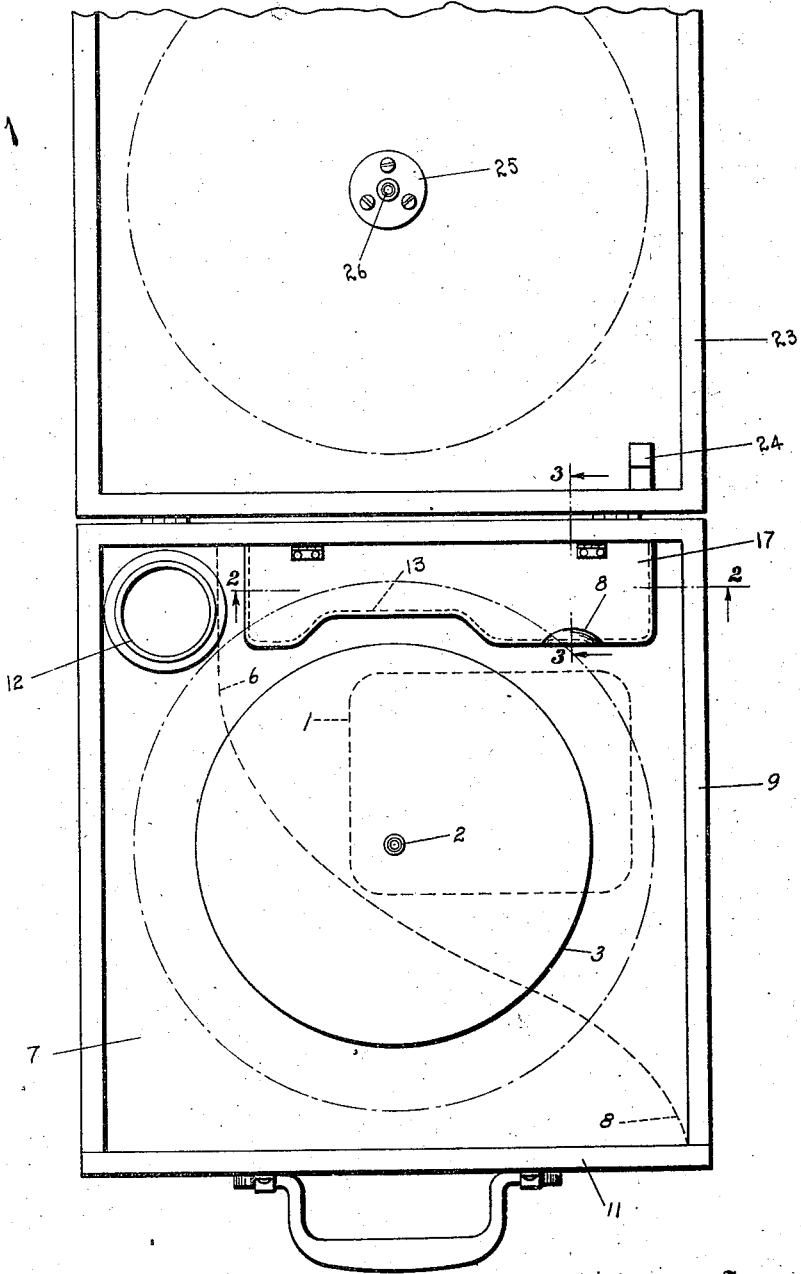
Fig. 1 is a top plan view of a portable talking machine embodying the invention, the lid or cover being in open position.
Figure 2:
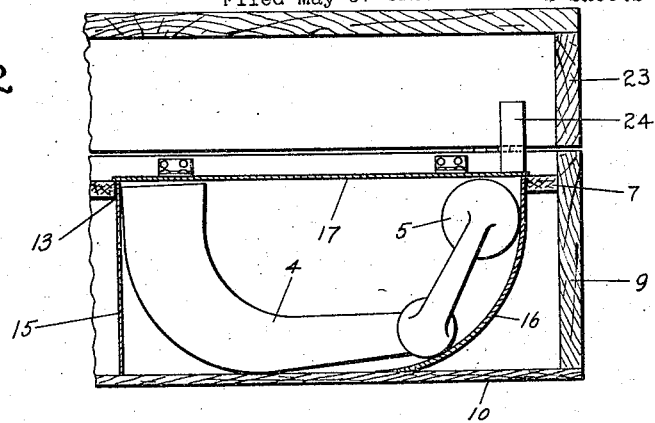
Fig. 2 is a detail section on the line 2—2 of Fig. 1, with the cover in closed position.
Figure 3:
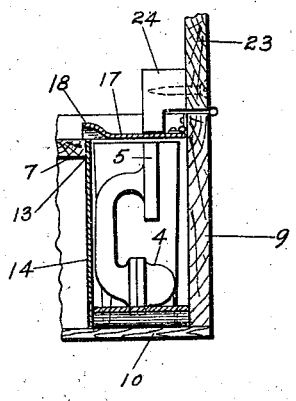
Fig. 3 is a detail section on the line 3—3 of Fig. 1.
Figure 4:
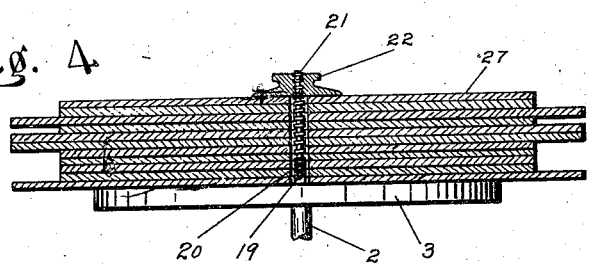
Fig. 4 is a detail sectional view of the record disc support.

In carrying out the invention, I employ a phonograph or talking machine of the disc record type and of any desired construction. The talking machine comprises a motor 1, a turn-table spindle 2, a turn-table 3, a tone-arm 4, carrying the usual sound-box or reproducer 5, which, when in operative position, is in communication with a horn 6.

The horn is below the usual motor board 7, and has a contracted neck and a flaring open front end 8. The motor board is mounted within a casing 9 preferably of rectangular form, and the bottom 10 of the casing and the motor board 7 may form the bottom and top of the horn if desired.

The front end 11 of the casing 9 is preferably hinged along the edge of the bottom of the casing whereby said side may be lowered to disclose the open flaring end of the horn. The end 11 may be provided with a handle by means of which the casing may be carried.

The spindle 2 projects through the motor board as is common and the turn-table is removably carried thereon in such a manner that it will rotate with the spindle.

The tone-arm 4 is adapted to communicate with the horn through a collar 12 carried on the motor board, and the tone-arm is readily removable from the collar.

The motor board is cut away at 13 and partitions 14, 15 and 16 are positioned between the motor board and the bottom 10 of the casing. The compartment thus formed is of a size and shape to receive the tone-arm with the sound-box attached. The tone-arm and sound-box will snugly fit within the compartment and will be prevented from rattling therein, and said compartment may be lined, if desired, with a fabric, felt or other like material. A lid or cover 17 is hinged to the motor-board at one side of the casing and will protect the tone-arm from injury. The cover 17 is provided with a lip 18 whereby the same may be raised.

The upper, exposed end of the turn-table spindle 2 instead of being spherical as is common, is flat, and is provided with an axial, screw threaded recess 19 adapted to receive the reduced screw threaded extremity 20 of a stud 21. The body of the stud 21 is provided with a coarse thread adapted to receive a nut 22.

Hinged to the upper edge of one of the sides of the casing 9 is a lid 23 which may be of considerable depth as shown. The lid 23 is preferably hinged along the same side of the casing as is the cover 17 and the lid 23 is provided with a cleat 24 which will engage the cover 17 and retain the same in closed position when the lid is closed, irrespective of the position of the casing. The cleat 24 is so proportioned and positioned that should the cover 17 be raised, the lid 23 on being closed will automatically lower the cover 17, and positively close the compartment containing the tone-arm and prevent the cover 17 from opening until the lid 23 is raised.

Attached to the inner side of the lid 23, is a plate 25, having a screw threaded orifice. By screwing the stud 21 into this orifice, records not in use when the machine is being played may be supported on said stud and secured in place by the nut 22, thus leaving the turntable free for the record in use.

Instead of employing a deep lid 23 the same may be flat whereby the depth of the casing or cabinet, as a whole, will be greatly reduced.

The operation is as follows:

When the device is not in use the tone-arm is removed from its operative position in communication with the horn and placed within the recess 13.

The reduced extremity of the stud 21 is screwed into the recess in the spindle 2. The records 27 intended for future use are now positioned on the turn-table. The lowermost records will encircle the end of the spindle and the remainder will engage the stud. The nut 22 may now be applied to the stud, and the records will be securely locked in position, when the lid 24 and side 11 are closed and locked in closed position.

When in use the stud and discs are removed from the turn-table, and the stud is screwed into the fitting 25 in the cover, which is in the position shown in Fig. 1, and the records are placed thereon as before, and may be used as desired.

In accordance with the provisions of the patent statute, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claim, and by means of which objects of my invention are attained, and the new results accomplished, as herein set forth, as it is obvious that the particular embodiment herein shown and described is only one of many that can be employed to attain these objects and accomplish these results.

Having now described my invention, what I claim and desire to secure by Letters Patent, is:—

A portable phonograph comprising a rectangular lidded receptacle, a horizontal partition dividing said receptacle into a deep lower compartment and a shallow upper compartment, a vertical, diagonally disposed, contrary flectured partition dividing said lower compartment and delimiting with said horizontal partition, a side wall and the base of the receptacle, a flared amplifier the mouth of which is substantially co-extensive with the width of said receptacle, the space behind said vertical partition containing a motor and a locker for detachable parts of the phonograph mechanism, said motor having one corner adjacent the center of said vertical partition and from which corner projects the turntable spindle, whereby said spindle is located in the center of the horizontal partition, a tone arm collar located at the corner of said horizontal partition and opening into said amplifier.

This specification signed this 9th day of April, 1920.

JOSEPH WOLFF.